US012741290B2

(12) United States Patent
Sekino et al.

(10) Patent No.: US 12,741,290 B2
(45) Date of Patent: Sep. 22, 2026

(54) LIQUID SPRAY NOZZLE AND LIQUID SPRAY DEVICE

(71) Applicant: SEIKO EPSON CORPORATION, Tokyo (JP)

(72) Inventors: Hirokazu Sekino, Chino (JP); Osamu Katsuda, Matsumoto (JP); Tomoki Abe, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/765,270

(22) Filed: Jul. 7, 2024

(65) Prior Publication Data

US 2025/0010313 A1 Jan. 9, 2025

(30) Foreign Application Priority Data

Jul. 7, 2023 (JP) ................................ 2023-112260

(51) Int. Cl.
*B05B 1/08* (2006.01)
*B05B 11/02* (2023.01)
*B05B 11/10* (2023.01)

(52) U.S. Cl.
CPC .............. *B05B 1/08* (2013.01); *B05B 11/028* (2023.01); *B05B 11/10* (2023.01)

(58) Field of Classification Search
CPC .... B05B 1/02; B05B 1/08; B05B 1/28; B05B 1/34; B05B 11/10; B05B 11/028; B05B 7/2405; B05B 7/2459–247; B05B 7/2437
USPC ........................................................ 239/338
See application file for complete search history.

(56) References Cited

U.S. PATENT DOCUMENTS 4,128,206 A * 12/1978 Bintner .................. B05B 1/042
239/599

FOREIGN PATENT DOCUMENTS

JP H10230190 A 9/1998

* cited by examiner

*Primary Examiner* — Steven M Sutherland
(74) *Attorney, Agent, or Firm* — CHIP LAW GROUP

(57) ABSTRACT

A liquid spray nozzle 1 includes a liquid sending member 2 in which a flow path 2*a* through which liquid 3 flows is formed; a nozzle member 5 formed with at least one nozzle aperture 5*a* that sprays the liquid 3 in continuous flow 3*a* and that forms the continuous flow 3*a* into droplets 3*b*; a first member 4 that is provided with a flowing path 4*a* configured to enable flow of the liquid 3, that is arranged between the liquid sending member 2 and the nozzle member 5, and that has one end 4*b* inserted into the flow path 2*a* of the liquid sending member 2; a nozzle pressing member 6 that presses and fixes the nozzle member 5 against the first member 4; and a second member 7 that is fixed to the liquid sending member 2 by pressing the liquid sending member 2 from an outer side of the liquid sending member 2 in a state where the one end 4*b* is inserted into the flow path 2*a*.

11 Claims, 7 Drawing Sheets

LIQUID SPRAY NOZZLE AND LIQUID SPRAY DEVICE

The present application is based on, and claims priority from JP Application Serial Number 2023-112260, filed Jul. 7, 2023, the disclosure of which is hereby incorporated by reference herein in its entirety.

BACKGROUND

1. Technical Field

The present disclosure relates to a liquid spray nozzle and a liquid spray device.

2. Related Art

In the related art, various liquid spray nozzles and liquid spray devices including the liquid spray nozzles have been used. Among these, there is a liquid spray nozzle which includes a liquid sending member in which a flow path through which liquid flows is formed and a nozzle member in which a nozzle aperture is formed. For example, there is disclosed in JP-A-10-230190 a washing nozzle in which an inner metal fitting with a closed tip end is inserted into a hose tip end section. The hose tip end section includes a configuration in which a hose is fastened and fixed to the inner metal fitting by a crimping metal tightening from the outer periphery of the hose. The hose tip end section is inserted into a hole of a base body. The base body and the hose tip end section are fixed by a solid agent. A plurality of nozzle apertures is formed in the crimped metal fitting, the hose, and the inner metal fitting from the outer periphery of the base body.

However, although the washing nozzle disclosed in JP-A-10-230190 is capable of washing an inner surface of a tube along the inner surface of the tube having a complex bend, the base body tends to become larger and larger with respect to the hose because washing nozzles intended for this purpose need a base body spherical and the like. In addition, it cannot be said that liquid can be sprayed with sufficient collision pressure for use in applications other than washing of an inner surface of a tube. Thus, related art liquid spray nozzles, such as that disclosed in JP-A-10-230190, are not compact and capable of spraying liquid at high collision pressure.

SUMMARY

The liquid spray nozzle of the present disclosure for solving the above-described problem includes a liquid sending member in which a flow path through which liquid flows is formed; a nozzle member formed with at least one nozzle aperture that sprays the liquid in a continuous flow and that changes the continuous flow into droplets; a first member that is provided with a flowing path configured to enable flow of the liquid, that is arranged between the liquid sending member and the nozzle member, and that has one end inserted into the flow path of the liquid sending member; a nozzle pressing member that presses and fixes the nozzle member against the first member; and a second member that is fixed to the liquid sending member by pressing the liquid sending member from an outer side of the liquid sending member in a state where the one end is inserted into the flow path.

DESCRIPTION OF EMBODIMENTS

Figure 1:
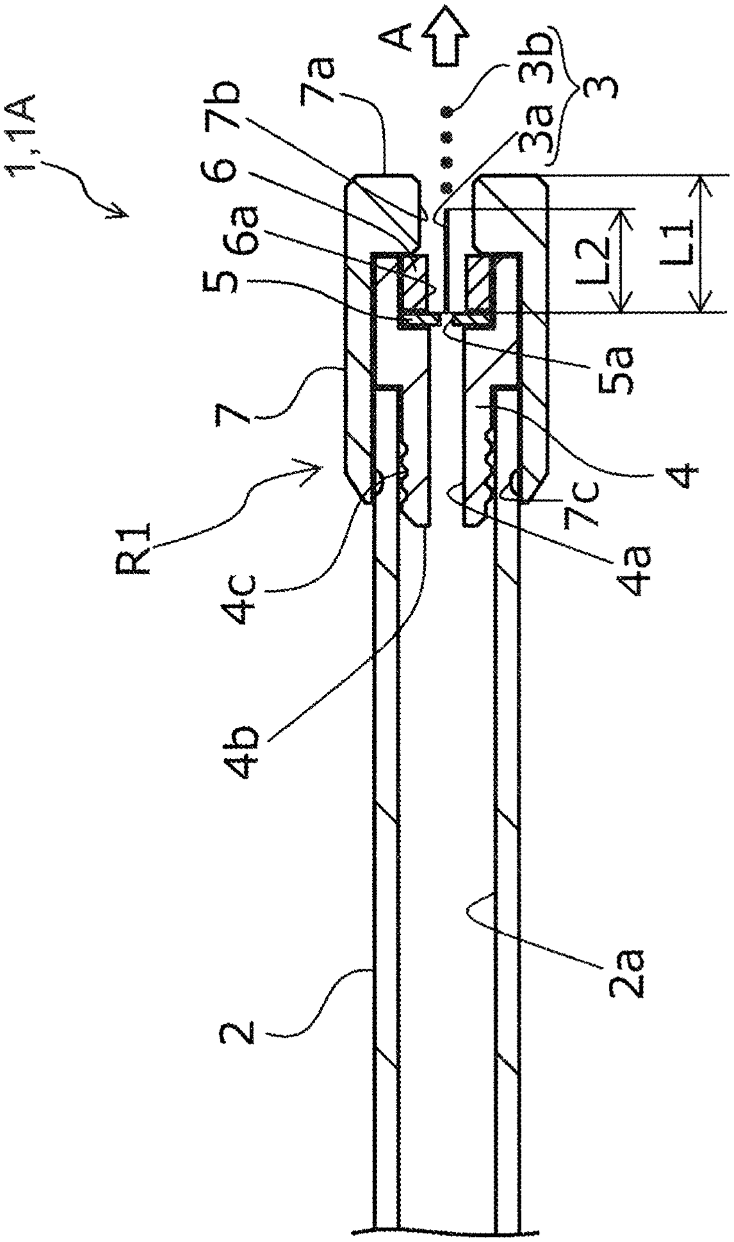
FIG. 1 is a cross-sectional diagram showing a liquid spray nozzle of a first embodiment.

First, the present disclosure will be schematically described.

A liquid spray nozzle according to a first aspect of the present disclosure for solving the above-described problem includes a liquid sending member in which a flow path through which liquid flows is formed; a nozzle member formed with at least one nozzle aperture that sprays the liquid in a continuous flow and that changes the continuous flow into droplets; a first member that is provided with a flowing path configured to enable flow of the liquid, that is arranged between the liquid sending member and the nozzle member, and that has one end inserted into the flow path of the liquid sending member; a nozzle pressing member that presses and fixes the nozzle member against the first member; and a second member that is fixed to the liquid sending member by pressing the liquid sending member from an outer side of the liquid sending member in a state where the one end is inserted into the flow path.

According to the aspect, it is possible to cause liquid to collide with a target by spraying liquid in a continuous flow and changing the continuous flow into droplets. As described above, by spraying liquid in a continuous flow and changing the continuous flow into droplets and collide with the target in droplets form, collision pressure caused by liquid is dramatically improved as compared with a configuration in which the liquid is simply sprayed in a continuous flow and collides with the target in continuous flow. In addition, in a state where one end of the first member to which the nozzle member is fixed by the nozzle pressing member is inserted into the flow path, the liquid spray nozzle is fixed to the liquid sending member by pressing the liquid sending member by the second member from an outside of the liquid sending member, and thus, it is possible to miniaturize the liquid spray nozzle.

A liquid spray nozzle according to a second aspect of the present disclosure is an aspect according to the first aspect, and the liquid spray nozzle further includes a spray tip end section spaced apart from the nozzle aperture by a first distance in a spray direction of the liquid, wherein the first distance is longer than a droplet formation distance until the continuous flow sprayed from the nozzle aperture changes into droplets.

According to the aspect, the first distance from the nozzle aperture to the spray tip end section is longer than the droplet formation distance. That is, when liquid is sprayed from the spray tip end section, the liquid is in a state of being changed into droplets. Therefore, even in a case where the spray tip end section is brought close to the target, it is possible to suppress liquid from colliding with the target in a state of a continuous flow, which is a state before liquid is changed into droplets. Therefore, even when the spray tip end section is brought close to the target, it is possible to cause liquid to collide with the target with strong collision pressure.

A liquid spray nozzle according to a third aspect of the present disclosure is an aspect according to the first or second aspect, and the second member is in a state where a portion of the second member bites into the liquid sending member at a position facing the first member via the liquid sending member.

According to the aspect, the second member is in a state where a portion of the second member bites into the liquid sending member at a position facing the first member via the liquid sending member. With such a configuration, it is possible to suppress the second member from coming off with respect to the liquid sending member.

A liquid spray nozzle according to a fourth aspect of the present disclosure is an aspect according to the third aspect, and at a position where the second member faces the first member via the liquid sending member, a female screw section is provided in the second member, and a male screw section to be fitted to the female screw section is provided in the liquid sending member.

According to the aspect, at a position where the second member faces the first member via the liquid sending member, a female screw section is provided in the second member, and a male screw section to be fitted to the female screw section is provided in the liquid sending member. With such a configuration, it is possible to particularly effectively suppress the second member from coming off with respect to the liquid sending member.

A liquid spray nozzle according to a fifth aspect of the present disclosure is an aspect according to the first or second aspect, and the first member is in a state where a portion of the first member bites into the liquid sending member at a position facing the second member via the liquid sending member.

According to the aspect, the first member is in a state where a portion of the first member bites into the liquid sending member at a position facing the second member via the liquid sending member. With such a configuration, it is possible to suppress the first member from coming off with respect to the liquid sending member.

A liquid spray nozzle according to a sixth aspect of the present disclosure is an aspect according to the first or second aspect, and at a position where the first member and the second member face each other and are in contact with each other, a female screw section is provided in the second member, and a male screw section to be fitted to the female screw section is provided in the first member.

According to the aspect, at a position where the first member and the second member face each other and are in contact with each other, a female screw section is provided in the second member, and a male screw section to be fitted to the female screw section is provided in the first member. With such a configuration, it is possible to particularly effectively suppress the second member from coming off with respect to the first member.

A liquid spray nozzle according to a seventh aspect of the present disclosure is an aspect according to the first or second aspect, and the first member includes a facing region that faces the nozzle pressing member, the first member is provided with a female screw section in the facing region, and the nozzle pressing member is provided with a male screw section to be fitted to the female screw section in the facing region.

According to the aspect, the first member is provided with a female screw section in the facing region, and the nozzle pressing member is provided with a male screw section to be fitted to the female screw section in the facing region. With such a configuration, it is possible to effectively suppress the nozzle pressing member from being detached from the liquid spray nozzle, and it is possible to effectively suppress a situation in which the nozzle pressing member is detached and the nozzle member cannot be pressed and fixed to the first member.

A liquid spray nozzle according to an eighth aspect of the present disclosure is an aspect according to the first or second aspect, and the one end of the first member is provided with a taper that is tapered so that the flowing path is widened toward a tip end.

According to the aspect, the one end of the first member is provided with a taper that is tapered so that the flowing path is widened toward a tip end. When liquid flows from the liquid sending member to the flowing path of the first member, turbulent flow is likely to be generated in the vicinity of the one end of the first member due to a step between the liquid sending member and the one end of the first member, and when turbulent flow is generated, there is a concern that the flow speed of the liquid may decrease. However, by providing the taper at one end of the first member in such a configuration, it is possible to reduce the step between the liquid sending member and the one end of the first member, and to suppress a decrease in the flow speed of liquid.

A liquid spray nozzle according to a ninth aspect of the present disclosure is an aspect according to the first or second aspect, and the second member is configured to cover an outside of the nozzle pressing member.

According to the aspect, the second member is configured to cover an outside of the nozzle pressing member. With such a configuration, it is possible to easily suppress the nozzle pressing member from being detached from the liquid spray nozzle, and it is possible to easily suppress a situation where the nozzle pressing member is detached and the nozzle member cannot be pressed and fixed to the first member.

A liquid spray device according to a tenth aspect of the present disclosure includes a liquid spray nozzle of an aspect according to the first or second aspect and a pump connected to the liquid spray nozzle.

According to the aspect, the liquid spray device includes the pump connected to the liquid spray nozzle. With such a configuration, liquid can be suitably supplied to the nozzle member of the liquid spray nozzle, and liquid can be sprayed with a strong spray pressure.

A liquid spray device according to an eleventh aspect of the present disclosure includes a liquid spray nozzle of an aspect according to the first or second aspect; a syringe connected to the liquid spray nozzle; and a piston configured to move the syringe.

According to the aspect, the liquid spray device includes the syringe connected to the liquid spray nozzle and the piston configured to move the syringe. Therefore, it is possible to suitably send liquid to the nozzle member of the liquid spray nozzle with a simple configuration.

First Embodiment

Hereinafter, embodiments of the present disclosure will be described with reference to the accompanying drawings. A liquid spray nozzle 1 is capable of spraying liquid 3 in a continuous flow **3*a*, changing the continuous flow 3*a* into droplets 3***b*, and causing the liquid 3 collide with a target in the droplet 3*b* state. First, a liquid spray nozzle 1A according to a first embodiment, which is an example of the liquid spray nozzle 1 of the present disclosure, will be described with reference to FIG. 1.

The liquid spray nozzle 1A of the present embodiment shown in FIG. 1 includes a liquid sending member 2, which is a tube made of resin, for example, in which a flow path 2*a* through which the liquid 3 flows is formed, and a nozzle member 5 in which at least one nozzle aperture 5*a*, which sprays the liquid 3 in the continuous flow 3*a* and changes the continuous flow 3*a* into droplets 3*b*, is formed. As shown in FIG. 1, the liquid spray nozzle 1A of the present embodiment includes a first member 4 that is provided with a flowing path 4*a* through which the liquid 3 can flow, that is arranged between the liquid sending member 2 and the nozzle member 5, and whose one end 4*b* is inserted into the flow path 2*a* of the liquid sending member 2 by press-fitting the one end 4*b* into the liquid sending member 2. Further, the liquid spray nozzle 1A of the present embodiment includes a nozzle pressing member 6 that presses and fixes the nozzle member 5 to the first member 4, and a second member 7 fixed to the liquid sending member 2 by pressing the liquid sending member 2 from an outside of the liquid sending member 2 in a state where the one end 4*b* is inserted into the flow path 2*a*.

As with the liquid spray nozzle 1A of the present embodiment, by spraying the liquid 3 in the continuous flow 3*a* and forming the continuous flow 3*a* into the droplets 3*b* to collide with a target in the droplet 3*b* form, collision pressure by the liquid 3 is remarkably improved as compared with a configuration in which the liquid 3 is simply sprayed in the continuous flow 3*a* to collide with the target in the continuous flow 3*a*. As in the liquid spray nozzle 1A of the present embodiment, the liquid spray nozzle 1 can be miniaturized by adopting a configuration in which the one end 4*b* of the first member 4, to which the nozzle member 5 is fixed by the nozzle pressing member 6, is inserted into the flow path 2*a* and, in this state, the one end 4*b* is fixed to the liquid sending member 2 by pressing the liquid sending member 2 by the second member 7 from outside the liquid sending member 2.

By using the liquid spray nozzle 1A of the present embodiment, it is possible to efficiently wash inner walls of containers that are long in the height direction, such as bottles with narrow mouths, such as baby bottles, and the like. In general, when washing a container that is tall in the height direction, there is a long distance from the nozzle member 5 to the target to be washed on which the droplets 3*b* land, so there is a risk that the spray speed of the droplets 3*b* attenuates, collision pressure is reduced, and washing power decreases. However, when a small-sized liquid spray nozzle 1 such as the liquid spray nozzle 1A of the present embodiment is used, it is possible to cause the droplets 3*b* to collide with a target to be washed while appropriately adjusting landing distances, and it is possible to suppress a decrease in washing power which may occur due to a structure of the liquid spray nozzle 1.

In the liquid spray nozzle 1A of the present embodiment, the liquid sending member 2 is a tube made of resins such as polyamide synthetic resin and polyetheretherketone resin. As the liquid sending member 2, for example, a member having a pressure resistance of 10 MPa or more and 20 MPa or less, and a member having an outer diameter of 1 mm or more and an inner diameter of 0.5 mm or more can be desirably used. In the liquid spray nozzle 1A of the present embodiment, the nozzle pressing member 6 is an annular metal rigid member in which an aperture section 6*a* constituting a flow path of the liquid 3 is formed. However, the configuration of the liquid sending member 2 and the nozzle pressing member 6 is not particularly limited.

In the liquid spray nozzle 1A of the present embodiment, the first member 4 and the second member 7 are made of metal, but the materials and shapes of the first member 4 and the second member 7 are not particularly limited. Furthermore, the nozzle member 5 in the liquid spray nozzle 1A of the present embodiment is a disk-shaped component made of metal with high tensile strength, such as stainless steel or nickel, and one or a plurality of nozzle apertures 5*a*, ranging from φ0.01 to φ0.15 mm, are formed, but there is no particular limitation on the material and shape of the nozzle member 5, nor on the shape and the number of nozzle apertures 5*a* formed. Here, in a case where the diameter of the aperture section 6*a* of the nozzle pressing member 6 is φ0.5 mm, the formation pitch of the nozzle apertures 5*a* between the nozzle apertures 5*a* when arranging a plurality of nozzle apertures 5*a* is in a range of ten times or more the diameter of the nozzle aperture 5*a* or 0.2 mm or less, and the number of apertures that can be arranged is provided in accordance with the diameter of the nozzle aperture 5*a*. The thickness of the nozzle member 5 may be, for example, in the range of 0.05 mm or more and 0.5 mm or less, and the nozzle aperture 5*a* can be formed by a method selected from drilling, etching, punching, and the like, and by forming in this manner, a small-sized liquid spray nozzle 1 can be produced.

Here, the diameter of the flowing path 4*a* of the first member 4 is desirably ten times or more and fifty times or less the diameter of the nozzle aperture 5*a*, and more desirably ten times or more and twenty times or less the diameter of the nozzle aperture 5*a*. It is desirable that the thickness of the second member 7 at a position R1 where the liquid sending member 2 is pressed is 0.8 times or more and 1.2 times or less the thickness of the liquid sending member 2. Further, in order to prevent the liquid spray nozzle 1 from becoming too large, it is desirable that the outer diameter of the second member 7 at the position R1 pressing the liquid sending member 2 is 1.4 times or less the outer diameter of the liquid sending member 2. The second member 7 is formed with an aperture section 7*b* connected to the nozzle aperture 5*a* of the nozzle member 5 and the aperture section 6*a* of the nozzle pressing member 6, but the diameter of the aperture section 7*b* is not particularly limited. However, the diameter of the aperture section 7*b* is desirably larger than the diameter of the nozzle aperture 5*a*.

As shown in FIG. 1, in the liquid spray nozzle 1A of the present embodiment, the distance from the nozzle aperture 5*a* to a tip end of the liquid spray nozzle 1A in a spray direction A of the liquid 3 corresponds to the distance from the nozzle aperture 5*a* to a tip end of the second member 7 in the spray direction A of the liquid 3. In other words, the liquid spray nozzle 1A of the present embodiment is provided with a spray tip end section 7*a* at a distance of a first distance L1 from the nozzle aperture 5*a* in the spray direction A of the liquid 3. As described above, the liquid spray nozzle 1A of the present embodiment sprays the liquid 3 in the continuous flow 3*a* and changes the continuous flow 3*a* into the droplets 3*b*, making it possible to collide the liquid 3 against a target to be washed in the state of the droplets 3*b*, as shown in FIG. 1, and the first distance L1 is configured to be longer than a droplet formation distance L2 from the nozzle aperture 5*a* until the sprayed continuous flow 3*a* is changed into the droplets 3*b*.

Since the liquid spray nozzle 1A of the present embodiment includes such a configuration, even when the spray tip end section 7*a* is brought close to a target, it is possible to suppress the liquid 3 from colliding with the target in a state of the continuous flow 3*a* which is a state before the liquid 3 is formed into droplets 3*b*. Therefore, the liquid spray nozzle 1A of the present embodiment can cause the liquid 3 to collide with a target not in a state of the continuous flow 3*a* but in a state of droplets 3*b* even when the spray tip end section 7*a* is brought close to a target, and can cause the liquid 3 to collide with a target with strong collision pressure.

Further, as shown in FIG. 1, the second member 7 in the liquid spray nozzle 1A of the present embodiment is configured to cover an outside of the nozzle pressing member 6 in the spray direction A, as well as in a circumferential direction intersecting the spray direction A. Since the liquid spray nozzle 1A of the present embodiment includes such a configuration, it is possible to easily suppress the nozzle pressing member 6 from being detached from the liquid spray nozzle 1A, and it is possible to easily suppress a situation in which the nozzle pressing member 6 is detached and the nozzle member 5 cannot be pressed and fixed to the first member 4.

Further, as shown in FIG. 1, in the liquid spray nozzle 1A of the present embodiment, the second member 7 is fixed to the liquid sending member 2 in such a manner that a convex section which bites into the liquid sending member 2 is generated in a portion 7*c* of the second member 7 by being crimped by being applied with force from the outside. In other words, in the liquid spray nozzle 1A of the present embodiment, the second member 7 is in a state where the portion 7*c* bites into the liquid sending member 2 at the position R1 facing the first member 4 via the liquid sending member 2. With such a configuration, it is possible to suppress the second member 7 from coming off with respect to the liquid sending member 2. As shown in FIG. 1, a state in which the portion 7*c* bites into the liquid sending member 2 means that the portion 7*c* of the second member 7 in a cross-sectional shape may include a structure in which the second member 7 enters the inside of the liquid sending member 2, and in addition to a structure in which the second member 7 bites into the liquid sending member 2 by crimping or the like as in the present embodiment, the second member 7 and the liquid sending member 2 may include a structure in which indentations and protrusions such as a helical screw groove are provided in advance to fit the indentations and protrusions of both.

As shown in FIG. 1, in the liquid spray nozzle 1A according to the present embodiment, indentations and protrusions 4*c* are formed at a position in the first member 4 where the second member 7 is crimped, that is, the position R1 in the first member 4 where the second member 7 and the first member 4 face each other. Therefore, in the liquid spray nozzle 1A of the present embodiment, the first member 4 is easily fitted to the liquid sending member 2 and does not easily come off.

In other words, at the position R1 in the liquid spray nozzle 1A of the present embodiment, where the first member 4 faces the second member 7 via the liquid sending member 2, which is the position at which the indentations and protrusions 4*c* are formed, the first member 4 is in a state in which a portion of the liquid sending member 2 bites into the first member 4 by the liquid sending member 2 partially entering into recess sections of the indentations and protrusions 4*c*. With such a configuration, it is possible to suppress the first member 4 from coming off with respect to the liquid sending member 2. Note that a state in which a portion of the liquid sending member 2 bites into something means a structure in which in the cross-sectional shape, a portion of the liquid sending member 2 enters into the first member 4, for example, as a structure other than the present embodiment, the first member 4 and the liquid sending member 2 may be a structure in which indentations and protrusions such as a helical screw groove are provided in advance to fit the indentations and protrusions of both.

Second Embodiment

Figure 2:
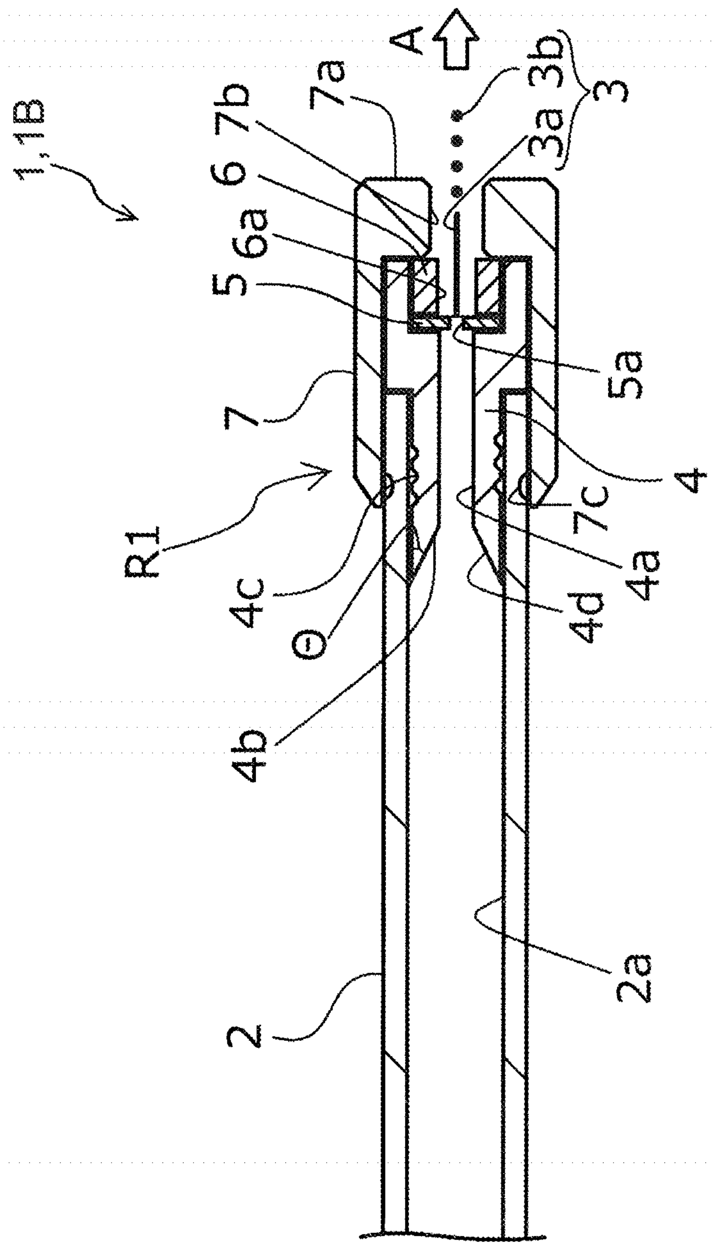
FIG. 2 is a cross-sectional diagram showing a liquid spray nozzle of a second embodiment.

Hereinafter, a liquid spray nozzle 1B of a second embodiment will be described with reference to FIG. 2. FIG. 2 is a diagram corresponding to FIG. 1 in the liquid spray nozzle 1A of the first embodiment. The liquid spray nozzle 1B of the present embodiment is the same as the liquid spray nozzle 1A of the first embodiment except for the configuration described below. Therefore, the liquid spray nozzle 1B of the present embodiment has the same features as those of the liquid spray nozzle 1A of the first embodiment except for the points described below. Therefore, in FIG. 2, constituent members common to the first embodiment are denoted by the same reference symbols, and a detailed description thereof will be omitted.

As shown in FIG. 2, in the liquid spray nozzle 1B of the present embodiment, one end 4*b* of the first member 4 is provided with a taper 4*d* in which the flowing path 4*a* is tapered so as to expand toward the tip end, or in other words, toward a direction opposite from the spray direction A. When the liquid 3 flows from the liquid sending member 2 to the flowing path 4*a* of the first member 4, turbulent flow is likely to be generated in the vicinity of the one end 4*b* of the first member 4 due to a step between the liquid sending member 2 and the one end 4*b* of the first member 4, and when turbulent flow is generated, there is a concern that the flow speed of the liquid 3 may decrease. However, by providing the taper 4*d* at the one end 4*b* of the first member 4 as in the liquid spray nozzle 1B of the present embodiment, it is possible to reduce the step between the liquid sending member 2 and the one end 4*b* of the first member 4, and to suppress a decrease in the flow speed of liquid 3.

In the liquid spray nozzle 1B of the present embodiment, the angle $\theta$ of the taper 4*d* with respect to the flow path 2*a* is about 30°. Although there is no particular limitation on the angle, in order to effectively exert the effect of suppressing turbulent flow, or to avoid the cross-sectional area of a flow path of the liquid 3 being suddenly reduced, it is desirably 30° or less.

Third Embodiment

Figure 3:
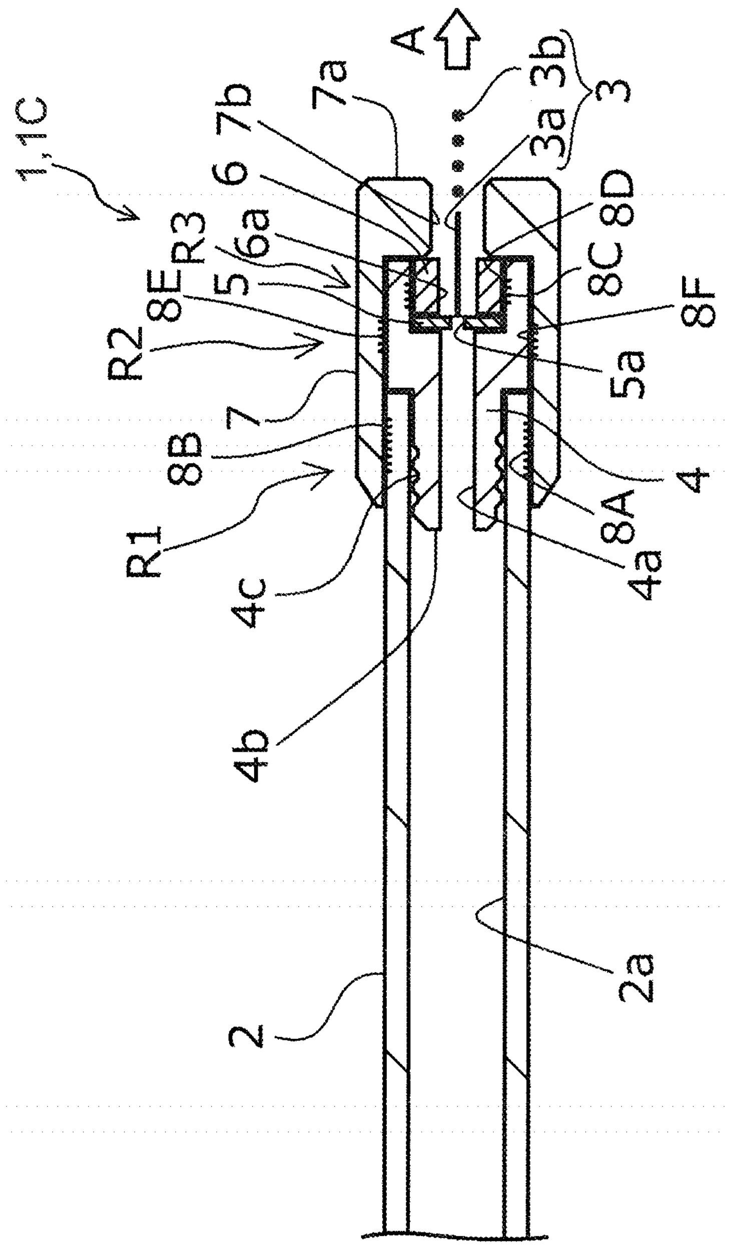
FIG. 3 is a cross-sectional diagram showing a liquid spray nozzle of a third embodiment.

Hereinafter, a liquid spray nozzle 1C of a third embodiment will be described with reference to FIG. 3. FIG. 3 is a diagram corresponding to FIG. 1 in the liquid spray nozzle 1A of the first embodiment. The liquid spray nozzle 1C of the present embodiment is the same as the liquid spray nozzle 1A of the first embodiment except for the configuration described below. Therefore, the liquid spray nozzle 1C of the present embodiment has the same features as those of the liquid spray nozzle 1A of the first embodiment except for the points described below. Therefore, in FIG. 3, constituent members common to the first embodiment and the second embodiment are denoted by the same reference symbols, and a detailed description thereof will be omitted.

As shown in FIG. 3, in the liquid spray nozzle 1C of the present embodiment, at the position R1 where the second member 7 faces the first member 4 via the liquid sending member 2, a female screw section 8B is provided in the second member 7, and a male screw section 8A to be fitted to the female screw section 8B is provided in the liquid sending member 2. With such a configuration, it is possible to particularly effectively suppress the second member 7 from coming off with respect to the liquid sending member 2.

As shown in FIG. 3, in the liquid spray nozzle 1C of the present embodiment, the first member 4 includes a facing region R3 that faces the nozzle pressing member 6, the first member 4 is provided with a female screw section 8D in the facing region R3, and the nozzle pressing member 6 is provided with a male screw section 8C to be fitted to the female screw section 8D in the facing region R3. With such a configuration, it is possible to effectively suppress the nozzle pressing member 6 from being detached from the liquid spray nozzle 1, and it is possible to effectively suppress a situation in which the nozzle pressing member 6 is detached and the nozzle member 5 cannot be pressed and fixed to the first member 4.

As shown in FIG. 3, in the liquid spray nozzle 1C of the present embodiment, at a position R2 where the first member 4 and the second member 7 face each other and are in contact with each other, a female screw section 8F is provided in the second member 7, and a male screw section 8E to be fitted to the female screw section 8F, is provided in the first member 4. With such a configuration, it is possible to particularly effectively suppress the second member 7 from coming off with respect to the first member 4.

When assembling the liquid spray nozzle 1C of the present embodiment, first, after setting the nozzle member 5, the female screw section 8D and the male screw section 8C are fit together to fix the first member 4 and the nozzle pressing member 6, then the female screw section 8F and the male screw section 8E are fit together to fix the first member 4 and the second member 7, and finally the female screw section 8B and the male screw section 8A are fit together to fix the second member 7 and the liquid sending member 2 performed in this order. The position and the number of a screw fixing sections 8, which fix a female screw section and a male screw section by fitting the female screw section and the male screw section together, are not limited to those of the liquid spray nozzle 1C of the present embodiment. For example, the male screw section 8A and the female screw section 8B, and the male screw section 8C and the female screw section 8D may be omitted, and only the female screw section 8F of the second member 7 and the male screw section 8E of the first member 4 may be provided as the screw fixing section 8, and when such a screw fixing section 8 is provided, any constituent member of the liquid spray nozzle 1 is less likely to come off.

Fourth Embodiment

Figure 4:
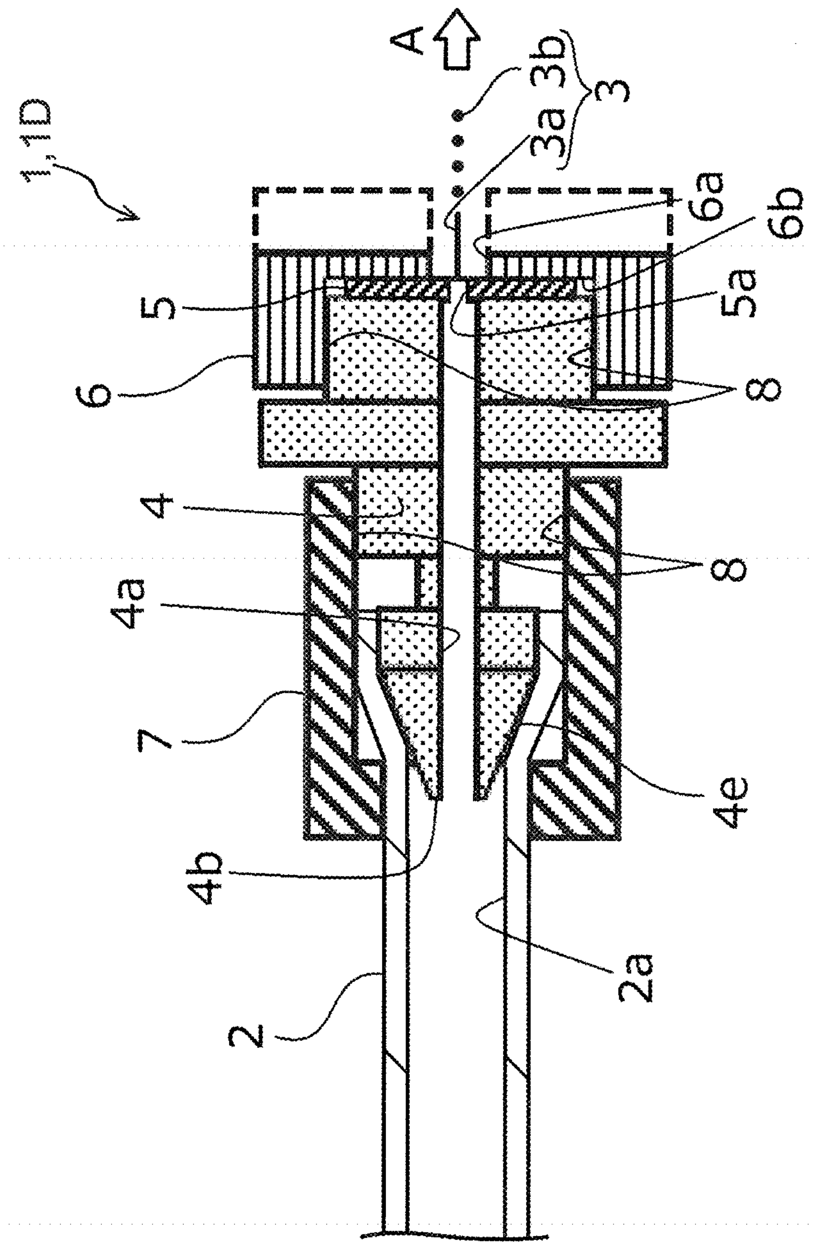
FIG. 4 is a cross-sectional diagram showing a liquid spray nozzle of a fourth embodiment.

Hereinafter, a liquid spray nozzle 1D of a fourth embodiment will be described with reference to FIGS. 4 and 5. FIG. 4 is a diagram corresponding to FIG. 1 in the liquid spray nozzle 1A of the first embodiment. The liquid spray nozzle 1D of the present embodiment is the same as the liquid spray nozzles 1 of the first to third embodiments except for the configuration described below. Therefore, the liquid spray nozzle 1D of the present embodiment has the same features as those of the liquid spray nozzles 1 of the first to third embodiments except for the points described below. Therefore, in FIGS. 4 and 5, constituent members common to the first to third embodiments are denoted by the same reference symbols, and a detailed description thereof will be omitted.

Figure 5:
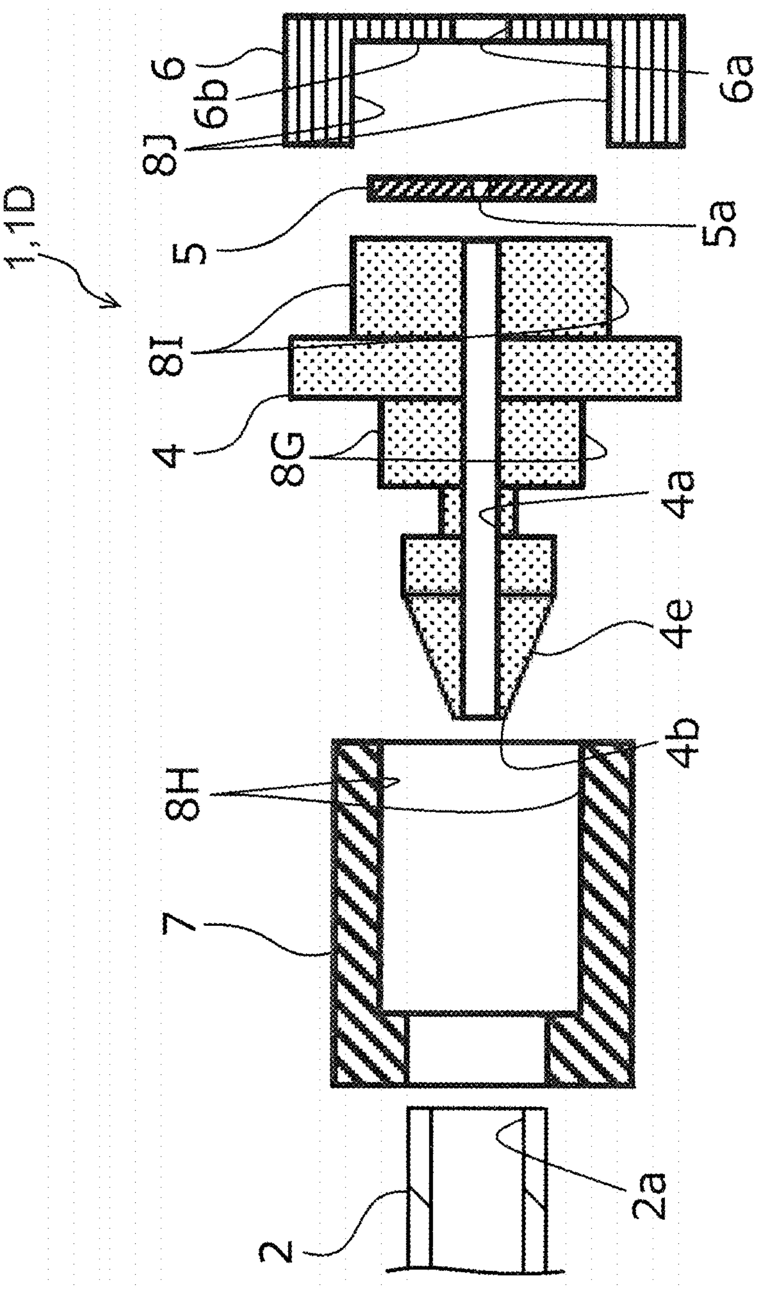
FIG. 5 is an exploded diagram showing the liquid spray nozzle of the fourth embodiment.

As shown in FIGS. 4 and 5, the liquid spray nozzle 1D of the present embodiment differs from the liquid spray nozzles 1 of the first to third embodiments in the shapes of the constituent members other than the liquid sending member 2 and the nozzle member 5. Specifically, the liquid spray nozzle 1D of the present embodiment includes the liquid sending member 2 including a configuration similar to that of the liquid sending member 2 of the liquid spray nozzle 1 of the first and second embodiments, and a nozzle member 5 including a configuration similar to that of the nozzle member 5 of the liquid spray nozzle 1 of the first to third embodiments. The liquid spray nozzle 1D includes the first member 4, which is a male screw joint type joint member that includes a male screw section 8I and that is inserted into an inner diameter section of the liquid sending member 2, the second member 7, and the nozzle pressing member 6, which is a pressure holding structure having a female screw section 8J fitted to the male screw section 8I.

The liquid spray nozzle 1D of the present embodiment passes a hard tube, such as polyamide synthetic resin or polyetheretherketone resin, which is the liquid sending member 2, through the second member 7 as a joint member, and press-fits the first member 4, which is a tube nipple as a joint member, into the flow path 2*a*, which is an inner diameter section of the liquid sending member 2. As shown in FIGS. 4 and 5, the liquid spray nozzle 1D of the present embodiment is designed to easily press-fit the first member 4 to the liquid sending member 2, with the one end 4*b* of the first member 4 including a slope section 4*e* formed so as to become thinner toward the tip end.

Here, as shown in FIG. 5, the male screw section 8G is provided on the first member 4, and the female screw section 8H fitted to the male screw section 8G is provided on the second member 7. Therefore, after the first member 4 is press-fitted into the liquid sending member 2, the second member 7 is rotated and fastened with respect to the first member 4. After the nozzle member 5 is installed in the installation section 6*b* provided in the nozzle pressing member 6, the nozzle pressing member 6 is rotated with respect to the male screw section 8I of the first member 4, and the female screw section 8J is rotated and fastened, whereby the liquid spray nozzle 1D of the present embodiment can be configured.

With such a configuration, the nozzle member 5 in which the nozzle aperture 5*a* is formed is easily attached, detached, or replaced, and washing of the nozzle member 5, replacement of the nozzle member 5 with the nozzle member 5 in which the nozzle aperture 5*a* having a different nozzle diameter, the different number of nozzles, or a different nozzle aperture shape is formed, and the like are easily performed. It is possible to provide a large number of inexpensive liquid spray nozzles 1, and the liquid spray nozzles 1 can be used as disposable parts in a wide range of fields such as industrial applications and consumer applications. Furthermore, it can be applied to medical applications by making each component suitable for medical use, such as using materials that can undergo a sterilization process for each component. The liquid spray nozzle 1D of the present embodiment is configured to be able to spray liquid at a maximum pressure of about 10 MPa.

As shown in FIG. 4, in the liquid spray nozzle 1D of the present embodiment, a first distance, which is a distance from the nozzle aperture 5*a* to a tip end of the nozzle pressing member 6 in the spray direction A of the liquid 3, is shorter than a droplet formation distance until the continuous flow 3*a* sprayed from the nozzle aperture 5*a* changes into the droplets 3*b*. However, it is more desirable to configure a first distance to be longer than a droplet formation distance until the continuous flow 3*a* sprayed from the nozzle aperture 5*a* is changed into the droplets 3*b*, for example, by configuring the nozzle pressing member 6 to have a long aperture section 6*a* of the nozzle pressing member 6 as represented by a broken line section in FIG. 4.

Fifth Embodiment

Figure 6:
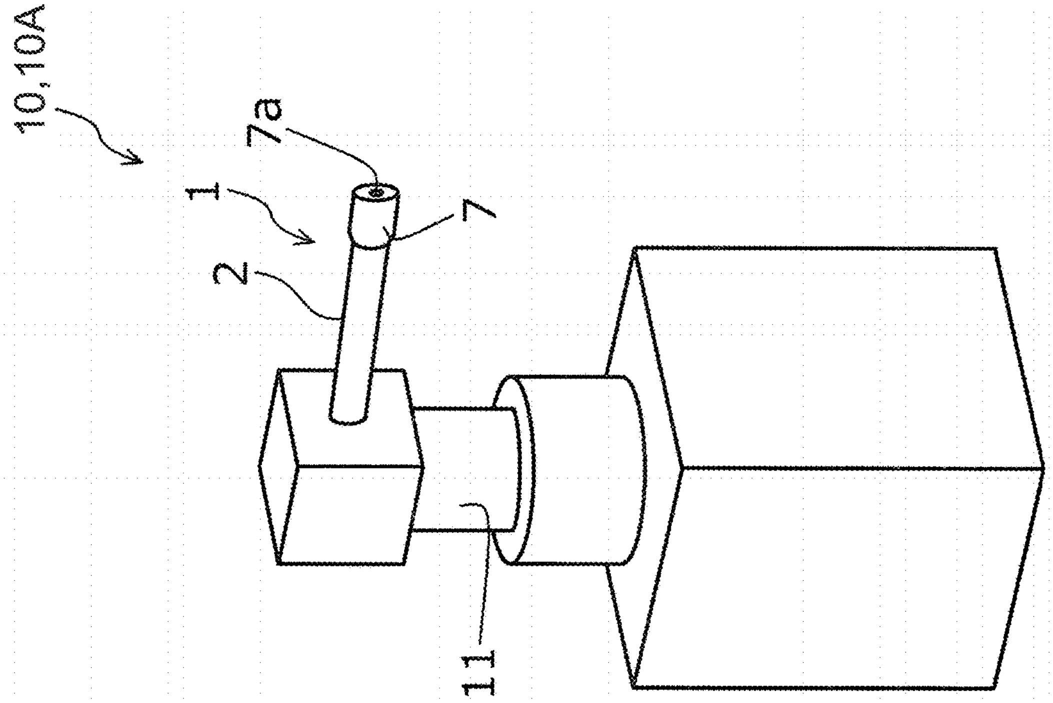
FIG. 6 is a schematic diagram showing a liquid spray device of a fifth embodiment, which is an example of a liquid spray device to which the liquid spray nozzles of the first to fourth embodiments can be mounted.

Hereinafter, a liquid spray device 10A as a fifth embodiment, which is an example of a liquid spray device 10 to which the liquid spray nozzle 1 of the first to fourth embodiments can be mounted, will be described. FIG. 6 is a schematic diagram showing the liquid spray device 10A of the present embodiment to which the liquid spray nozzle 1 of the first to fourth embodiments can be mounted. Since the liquid spray device 10A of the present embodiment can be mounted with the liquid spray nozzle 1 of the first to fourth embodiments, the constituent members common to the first to fourth embodiments are denoted by the same reference symbols in FIG. 6, and a detailed description thereof is omitted.

As shown in FIG. 6, the liquid spray device 10A of the present embodiment includes the liquid spray nozzle 1 of any one of the first to fourth embodiments, and a pump 11 connected to the liquid spray nozzle 1. With such a configuration, the liquid 3 can be suitably sent to the nozzle member 5 of the liquid spray nozzle 1, and the liquid 3 can be sprayed with a spray pressure.

Sixth Embodiment

Figure 7:
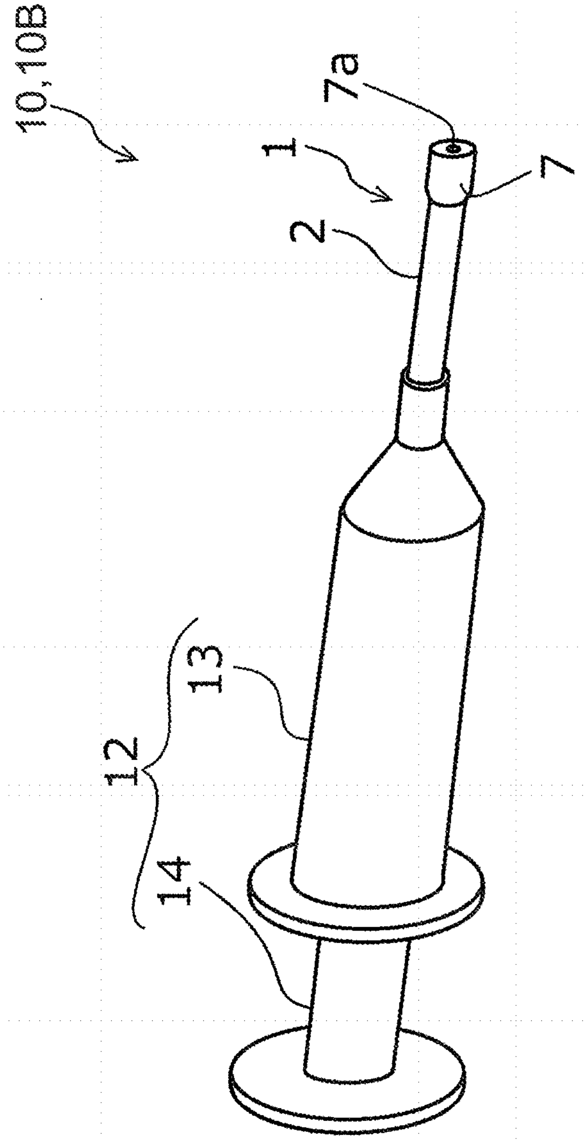
FIG. 7 is a schematic diagram showing a liquid spray device of a sixth embodiment, which is an example of a liquid spray device to which the liquid spray nozzles of the first to fourth embodiments can be mounted.

Hereinafter, a liquid spray device 10B as a sixth embodiment, which is an example of the liquid spray device 10 to which the liquid spray nozzle 1 of the first to fourth embodiments can be mounted, will be described. FIG. 7 is a schematic diagram showing the liquid spray device 10B of the present embodiment to which the liquid spray nozzle 1 of the first to fourth embodiments can be mounted. Since the liquid spray device 10B of the present embodiment can mount the liquid spray nozzle 1 of the first to fourth embodiments, the constituent members common to the first to fourth embodiments are denoted by the same reference symbols in FIG. 7, and a detailed description thereof is omitted.

As shown in FIG. 7, the liquid spray device 10B of the present embodiment includes a liquid spray nozzle 1 of any one of the first to fourth embodiments, a syringe 13 connected to the liquid spray nozzle 1, and a piston 14 that moves the syringe 13. The syringe 13 connected to the liquid spray nozzle 1 and a piston 14 that moves the syringe 13 form a push out mechanism 12 that pushes out the liquid 3 stored in the syringe 13 toward the liquid spray nozzle 1. Since the push out mechanism 12, which is composed of the syringe 13 and the piston 14, includes a simple structure that can be used in a disposable manner, the liquid spray device 10B of the present embodiment includes a simple structure and can suitably send the liquid 3 to the nozzle member 5 of the liquid spray nozzle 1.

The present disclosure is not limited to the above-described embodiments, and can be realized by various configurations without departing from the scope of the disclosure. The technical features in the present embodiments corresponding to the technical features in each aspect described in the summary of the disclosure can be appropriately replaced or combined in order to solve a part or all of the problems described above or in order to achieve a part or all of the effects described above. In addition, unless the technical features are described as essential in the present specification, the technical features can be appropriately deleted.

What is claimed is:

1. A liquid spray nozzle comprising:

a tube in which a flow path through which liquid flows is formed;

a nozzle member formed with at least one nozzle aperture, wherein the at least one nozzle aperture is configured to:

spray the liquid in a continuous flow; and change the continuous flow into droplets;

a first member that is provided with a flowing path configured to enable flow of the liquid, that is arranged between the tube and the nozzle member, and that has one end inserted into the flow path of the tube;

a metal rigid member that presses and fixes the nozzle member against the first member;

a second member that is fixed to the tube by pressing the tube from an outer side of the tube in a state where the one end of the first member is inserted into the flow path, wherein the second member is in a state where a portion of the second member bites into the tube at a position where the second member faces the first member via the tube, the first member has indentations and protrusions at the position where the second member faces the first member via the tube, and a portion of the tube bites into the first member in a state where the tube is partially entered into recess sections of the indentations and protrusions; and a spray tip end section spaced apart from the at least one nozzle aperture by a first distance in a spray direction of the liquid, wherein the first distance is longer than a droplet formation distance, the droplet formation distance is from the at least one nozzle aperture until the continuous flow is changed into the droplets, and an inner diameter of a hole of the spray tip end section is larger than an inner diameter of the metal rigid member.

2. The liquid spray nozzle according to claim 1, wherein at the position where the second member faces the first member via the tube, a female screw section is provided in the second member, and a male screw section to be fitted to the female screw section is provided in the tube.

3. The liquid spray nozzle according to claim 1, wherein the first member is in a state where a portion of the first member bites into the tube at a position facing the second member via the tube.

4. The liquid spray nozzle according to claim 1, wherein at a position where the first member and the second member face each other and are in contact with each other, a female screw section is provided in the second member, and a male screw section to be fitted to the female screw section is provided in the first member.

5. The liquid spray nozzle according to claim 1, wherein the first member includes a facing region that faces the metal rigid member, the first member is provided with a female screw section in the facing region, and the metal rigid member is provided with a male screw section to be fitted to the female screw section in the facing region.

6. The liquid spray nozzle according to claim 1, wherein the one end of the first member is provided with a taper that is tapered so that the flowing path is widened toward a tip end.

7. The liquid spray nozzle according to claim 1, wherein the second member is configured to cover an outside of the metal rigid member.

8. A liquid spray device comprising: the liquid spray nozzle according to claim 1 and a pump connected to the liquid spray nozzle.

9. A liquid spray device comprising: the liquid spray nozzle according to claim 1; a syringe connected to the liquid spray nozzle; and a piston configured to move the syringe.

10. The liquid spray nozzle according to claim 1, wherein at the position where the second member faces the first member via the tube, an outer diameter of the second member is 1.4 times or less than an outer diameter of the tube.

11. The liquid spray nozzle according to claim 1, wherein a diameter of the flowing path of the first member is ten times or more and twenty times or less than a diameter of the at least one nozzle aperture.

* * * * *